(Model.)

E. C. & V. STRAYER.
ELEVATED RESERVOIR, WARMING OVEN, AND SHELF FOR STOVES.

No. 279,456. Patented June 12, 1883.

WITNESSES:
Chas. T. Howell.
C. Sedgwick

INVENTOR:
E. C. Strayer
V. Strayer
BY Munn & Co
ATTORNEYS.

UNITED STATES PATENT OFFICE.

EBER C. STRAYER AND VALENTINE STRAYER, OF CALMAR, IOWA.

ELEVATED RESERVOIR, WARMING OVEN, AND SHELF FOR STOVES.

SPECIFICATION forming part of Letters Patent No. 279,456, dated June 12, 1883.

Application filed March 10, 1883. (Model.)

*To all whom it may concern:*

Be it known that we, EBER C. STRAYER and VALENTINE STRAYER, of Calmar, Winneshiek county, Iowa, have invented a new and Improved Elevated Reservoir, Warming Oven, and Shelf for Stoves, of which the following is a full, clear, and exact description.

This invention relates to improvements in heating-drums for stoves; and it consists in the combination and arrangement of parts, substantially as hereinafter fully set forth and claimed.

Reference is to be had to the accompanying drawings, forming a part of this specification, in which similar letters of reference indicate corresponding parts in all the figures.

Figure 1:
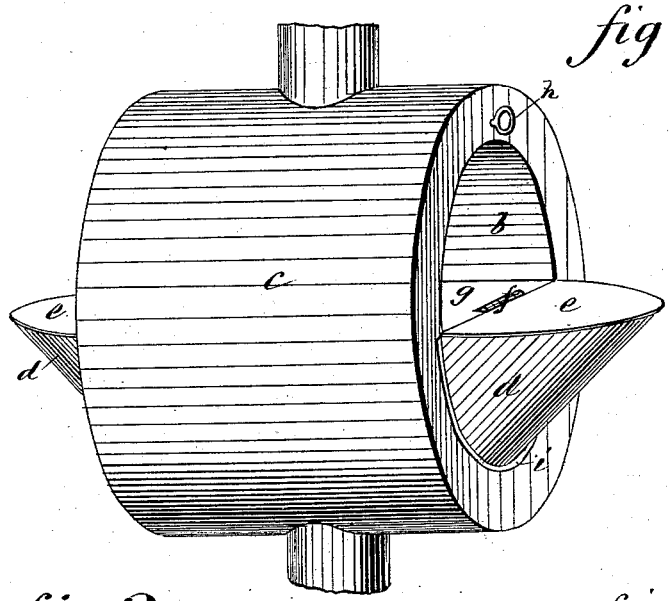
Figure 2:
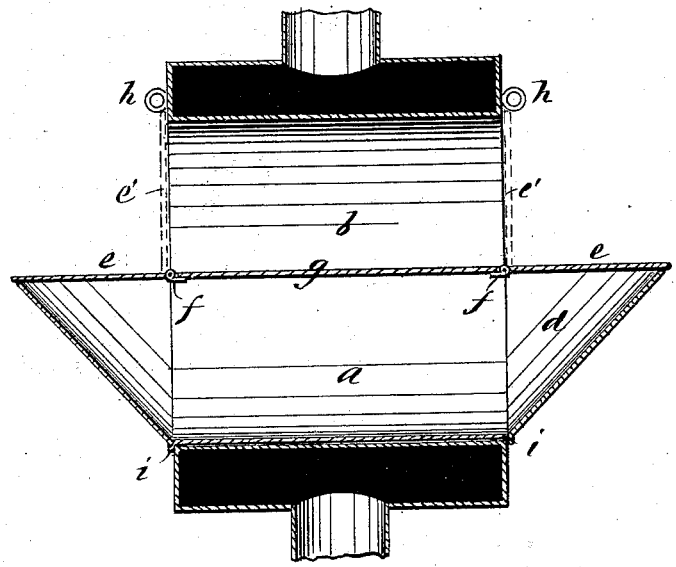
Figure 3:
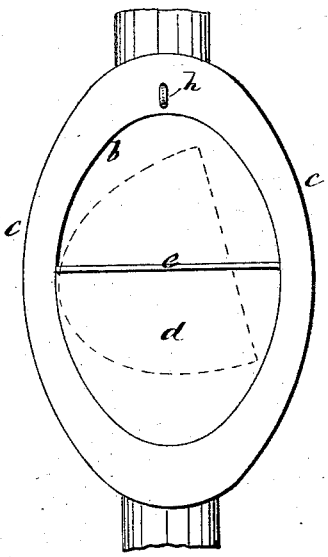

Figure 1 is a perspective view of my improved reservoir, oven, and shelf arranged with the heating-drum, to which it is to be applied. Fig. 2 is a longitudinal sectional elevation of the same; and Fig. 3 is an end elevation of the drum, reservoir, oven, and shelf, with dotted lines showing the means of shifting the reservoir for enabling it to be removed from the drum.

We make a deep pan, $a$, of sheet metal, of about half the size in cross-section of the oval or other shaped central opening, $b$, of a common heating-drum, $c$, and of equal length with the drum, and having projecting ends $d$ tapering up from the bottom to the top, over which ends we provide covers $e$, hinged at $f$ to the fixed portion $g$ of the cover of the pan, said covers $e$ affording the requisite access to the pan for putting in and taking out the water, and when closed down on the ends $d$ affording shelves for warming purposes, which, together with the cover $g$, provide a large and substantial warm-shelf partly inclosed by the drum, and being thereby very serviceable for the purpose; but by turning up the covers $e$ against the ends of the drum and fastening them by buttons $h$, as indicated by the dotted lines $e'$, Fig. 2, the space within the drum is converted into an inclosed oven, affording practicable service as such. The pan has a rib, $i$, at each end, projecting outward, for flanges to bear against the ends of the drum to hold the pan securely in place, which makes it necessary to tilt it up, as indicated by the dotted lines in Fig. 3, when the pan is to be put in or taken out of the drum.

Having thus described our invention, we claim as new and desire to secure by Letters Patent—

In a heating-drum for stoves, the combination, with the oval drum $c$, having the opening $b$, of the pan $a$, adapted to fit in the lower half of said opening, and having semicircular flanges $i$ around its ends, said flanges lapping the ends of the drum $c$, whereby the pan is removably held in position in the drum and adapted to be readily removed, substantially as set forth.

EBER C. STRAYER.
VALENTINE STRAYER.

Witnesses:
P. OLSON,
WM. J. CIZEK.